UNITED STATES PATENT OFFICE.

ADALBERT KOLB, OF CHARLOTTENBURG-WESTEND, GERMANY, ASSIGNOR TO THE PERMUTIT COMPANY, OF NEW YORK, N. Y.

PROCESS OF BASE EXCHANGE, &c.

1,193,795.

Specification of Letters Patent. Patented Aug. 8, 1916.

No Drawing. Application filed March 28, 1916. Serial No. 87,359.

*To all whom it may concern:*

Be it known that I, ADALBERT KOLB, professor, Dr. Chem., a subject of the Grand Duke of Hesse, German Empire, residing at No. 6 Leistikowstrasse, Charlottenburg-Westend, near Berlin, German Empire, have invented new and useful Improvements in Processes of Base Exchange, &c., and do hereby declare the following to be a full, clear, and exact description of the same.

It is known that zeolite-like compounds containing alkali or earth alkali bases, aluminium oxid, silicic acid and water, are characterized by base exchange. These compounds, which, according to Gans, are to be regarded as aluminate silicates, and are considered by others to be solid solutions, are able to exchange their bases when brought into contact with solutions containing other bases, the base in solution being taken up by said zeolite-like compound, and its own bases being exchanged therefor. In a similar way these materials may be used for exercising catalytic actions in various processes of purifying or treating liquids; the material being charged with catalytic oxids or substances by treatment with various metal salt solutions capable of giving up their bases thereto or of depositing oxids, etc., in the pervious or ultra-microscopically porous material. For this latter purpose however these alumina-containing materials are rather too sensitive to acids and many other chemical reagents. These properties of aluminate silicates is already employed in carrying out various technical processes. Artificial or natural exchange aluminate silicate is used for softening water, and for removing iron, manganese, or other undesirable bases, from water for drinking or other purposes, removing potassium and other bases from sugar juice, molasses, salt solutions, etc. These base exchanging compounds can also be used to obtain metals or their compounds from liquids in which they are only contained in small quantities, for example gold from sea water, radium from wells containing radium, etc. Finally, new salts can be made by base exchange, for example, alkali carbonates by passing an ammonium carbonate solution over an alkali aluminate silicate. In connection with these various uses to which aluminate silicates are put it has been found to be a drawback that said silicates are rather sensitive to many chemical reagents, such as free acids, with which the aluminate silicate is gradually split up. It is now possible to overcome this drawback by producing other compound silicates in which the aluminium oxid is replaced by chromium oxid. Such a composition which may be termed a chromite silicate has not only a very good base exchanging property but is also characterized by mechanical hardness and high chemical resistance to hot water, cold acids and alkalis, etc.

In technical literature it is said that base exchanging chromite silicates cannot be produced (see Gmelin-Kraut: *Text Book of Inorganic Chemistry*, 7 edition, Volume III, 1, page 1314, or F. Singer: *On Artificial Zeolites*, etc. *Dissertation at the Technical University*, Berlin, 1910, experiment 27, page 36/37, as well as page 45). Further it is mentioned that by melting together corresponding quantities of sodium oxid, chromium oxid and silica a glass like product is obtained, which when lixiviated with water, forms a slime which does not possess base exchanging properties (see Gmelin-Kraut, same volume, page 1392, or Singer's *Dissertation*, page 36). According to these authorities there is no possibility of obtaining base exchanging chromite silicates, and from a theoretical standpoint there is no reason to take the opposite view, because in a chromite the alkali is but loosely united and chromium does not form a simple compound with silica (see Gmelin-Kraut above).

Now it has been found that, contrary to previous experience, base exchanging chromite silicates can be obtained, and indeed from alkaline chromite salt solutions, by adding a solution of alkali silicate. In doing so it is necessary to avoid an excess of free alkali, in order not to dilute the solutions too much, and to work without heating the same. In order to convert the precipitate into a granular solid form suitable for technical purposes, said precipitate, after it has been decanted, is washed (a small residue of free alkali being purposely left therein), then pressed, dried and the hard substance or cake obtained is introduced into hot water. The mass breaks up with a loud crackling sound into green, or dark green, coarsely granular, crystal-like pieces, which consist of sodium oxid, chromium oxid, silica and water.

In a typical method of making such a material, 38 parts by weight, as for example 38 kilograms, of chrome potash alum (or corresponding quantities of other chromium salts, such as chromium sulfate) are dissolved in 200 parts by weight, say 200 kilograms, of water, and the solution is agitated and well mixed. It is then mixed with 33 parts by volume, say 33 liters, of commercial caustic soda solution or lye of 39.5° Baumé, diluted with an equal volume of water; that is, with the quantity of alkali solution requisite for the formation of a soluble chromite. The alkaline solution is next diluted to make a volume of about 500 liters and this diluted solution, while under vigorous agitation, is treated with a suitable quantity, say 32 kilograms of commercial water glass solution of 38° Baumé (containing 24 per cent. by weight $SiO_2$ and 10.5 per cent. of $Na_2O$) previously diluted with an equal volume of water. A deposit is formed and this deposit is washed, pressed and dried at a temperature below 100° C. As noted, the washing is not complete; there should still be a small amount of free alkali left in the cake or mass formed on washing and pressing. The dried material is a dark green mass which when treated with hot water breaks up with a crackling sound to form a hard, uniformly coarse, granular product. These granules may be used for softening hard water by passing such water through a filter-like bed thereof. In so doing the material exchanges its bases for the magnesia and lime of the water. It may be revived after a period of use by treatment with a NaCl solution, when it takes up sodium, the calcium and magnesium going into solution as chlorids. It is then ready for reuse. Like preparations may be made with certain other oxids soluble in alkali and of more or less acid properties, these oxids being used in lieu of or in addition to the chromium oxids, as for instance, boron trioxid, vanadium oxids, tungsten oxids, etc.

Advantageous materials may be made by using in lieu of pure chromium salts, mixtures of chromium salts with other materials in forming base exchanging bodies; with the result of forming mixed products which also have a high resistance to mechanical stress and chemical reagents. The chemically resistant nature of these bodies makes them also useful as materials for performing various catalytic processes.

The ordinary base exchanging materials containing alumina, alkali and silica, may be used as materials or carriers for making catalysts of high efficiency; such catalysts being made by allowing various metal salt solutions to act on these base exchanging bodies which are of porous or pervious nature; the pores being frequently ultramicroscopic. In so doing, however, care must be used in making catalysts from these base exchanging bodies of the prior art because of their lack of resistance to acids and the like.

With the present highly resistive chromite silicates and like materials, catalytically acting bodies of high activity may be obtained by an after treatment with solutions of salts of, for example, cobalt, nickel, copper, manganese, lead, etc. In so doing, granular, hard and rigid bodies exhibiting a high degree of resistance to chemical reagents may be obtained; and these compound catalyzers are consequently of use in processes where alkalis and acids are present. In making an oxidizing catalyst for treating water to remove iron or manganese, for example, the material may be caused to take up manganese oxid by exchange by treating with a solution of a manganese salt and the manganese then oxidized as by treatment with permanganate.

The following may serve as examples of such catalytitc processes: removing iron and manganese from mineral waters containing carbonic acid by oxidizing the iron and manganese compounds in the water by means of atmospheric oxygen; removing oxygen from water by adding sodium sulfite, which is changed into sodium sulfate; converting sodium bisulfite into (acid) bisulfate, converting of sodium hypochlorite into sodium chlorid either for the purpose of sterilizing liquids or, in larger quantities, for producing oxygen; in sterilizing liquids by means of ozone, chlorin, hydrogen superoxid, potassium permanganate, etc.; conversion of protoxid of manganese into permanganic acid, etc. Further examples are: the conversion of hydrochloric acid leucomalachite into the dye by oxidation in an aqueous solution; the conversion of alcohol into aldehyde and finally into acetic acid, and the oxidation of benzol aldehyde to benzoic acid.

What I claim and desire to secure by Letters Patent of the United States is:—

1. The process of treating liquids which comprises passing such liquids through a bed of a hard granular material containing combined chromium, alkali, silica and water.

2. The process of treating liquids which comprises passing such liquids through a bed of a hard granular material containing combined chromium, the oxid of another metal, alkali, silica and water.

3. The process of purifying water which comprises passing water to be purified through a bed of hard granular material containing combined chromium, alkali, silica and water.

4. The process of purifying water which comprises passing water to be purified through a bed of hard granular material containing combined chromium, the oxid of another metal, alkali, silica and water.

5. In catalytically treating water and solutions, the process which comprises passing the liquid through a granular bed of minutely pervious material containing combined chromium, silica water and alkali and also containing a catalytically acting material.

In testimony whereof, I have signed my name to this specification in the presence of two subscribing witnesses.

ADALBERT KOLB.

Witnesses:
　ERNST BASCH,
　THEODOR KLINCKHARD.